United States Patent

[11] 3,622,437

[72] Inventors Edward C. Hobaica
   Mystic, Conn.;
   Sidney D. Cook, Warwick, R.I.
[21] Appl. No. 823,270
[22] Filed May 9, 1969
[45] Patented Nov. 23, 1971
[73] Assignee General Dynamics Corporation
   New York, N.Y.

[54] COMPOSITE BUOYANCY MATERIAL
   9 Claims, 2 Drawing Figs.
[52] U.S. Cl. .................................................. 161/168,
   9/8 R, 114/69, 161/DIG. 5
[51] Int. Cl. ...................................................... B63b 43/00
[50] Field of Search.......................................... 161/159,
   162, 165, 168, 170, 407, DIG. 5; 114/68, 69; 9/8;
   260/2.5 B

[56] References Cited
   UNITED STATES PATENTS
   3,257,265  6/1966  Isenberg....................... 161/162 X
   3,336,184  8/1967  Stastny et al.................. 161/168
   3,353,981  11/1967  Jacob............................ 260/2.5 B
   3,477,967  11/1969  Resnick......................... 260/2.5 B
   3,503,840  3/1970   Parrish......................... 161/159

OTHER REFERENCES

Proteus Inc.; Final Report on Selection of Buoyant Materials for Deep Submergence Search Vehicle; Report under Contract NOsp 65208- f dated Oct. 1, 1965. Available from National Technical Information Service AD 487 688.

Proteus Inc.; Properties of Buoyant Materials and Structures; Report under Contract NONR 427100 dated Aug. 15, 1964; Available from National Technical Information Service AD 609 821.

Primary Examiner—Robert F. Burnett
Assistant Examiner—Raymond O. Linker, Jr.
Attorney—William C. Everett ABSTRACT: A buoyancy material is provided having hollow spheres made of a thermoplastic resin, encased in a matrix of syntactic foam. The spheres may be of a single diameter or of two or more diameters, each being one-seventh the diameter of the next larger.

PATENTED NOV 23 1971    3,622,437

EDWARD C. HOBAICA
SIDNEY D. COOK
INVENTORS

BY William C. Everett
Attorney

COMPOSITE BUOYANCY MATERIAL

This invention relates to a composite buoyancy material for use in a variety of underwater environments.

In underwater work of various kinds, such as small research submarines and offshore oil installations, it is necessary to provide buoyancy material to offset the weight of equipment. This buoyancy material must be impermeable to water and must be capable of withstanding pressures of the magnitude encountered in deep sea environments, for example at 2,000 feet below the surface. It is also important that the buoyancy material should be of low density because relatively high-density buoyancy materials require a great many pounds of buoyancy material for a given requirement of pounds buoyancy, pounds buoyancy being the difference in weight between the buoyancy material and the weight of sea water of the same volume.

Up to the present time, it has been possible to achieve structurally sound buoyancy materials having densities as low as 29 pounds per cubic foot by the use of syntactic foam. These lightest weight syntactic foams are limited to depths of 600 feet or less. In such case, each cubic foot of material weighing 29 pounds in sea water provides 35 pounds of buoyancy. Densities of 36 pounds per cubic foot are required for depths to 6,500 feet.

The present invention provides a buoyancy material satisfying the foregoing requirements and having a density on the order of 22 pounds per cubic foot, and as low as 18 pounds per cubic foot. To achieve this, the invention provides a composite material having hollow spheres of a thermoplastic material, imbedded in a matrix of syntactic foam. It has been discovered that the implosion pressure limit of a hollow sphere of thermoplastic material approximately doubles when imbedded in a syntactic foam as a result of the added stiffness support of the foam. In addition, since the packing densities of the spheres may run to as high as 85 percent of the total volume filled, the use of the costly syntactic foam is sharply reduced, thereby even more sharply reducing the total cost per pound of buoyancy.

Accordingly, it is an object of the invention to provide a buoyancy material having a density in the order of 22 pounds per cubic foot. It is another object of the invention to provide a buoyancy material having a very substantially reduced cost per pound of buoyancy. It is yet another object of this invention to provide an extremely efficient, rigid, lightweight buoyancy structure, for use at deep depths.

The foregoing and other objects will be apparent from the following description of a preferred embodiment of the invention when taken in connection with the attached drawings, in which.

Figure 1:
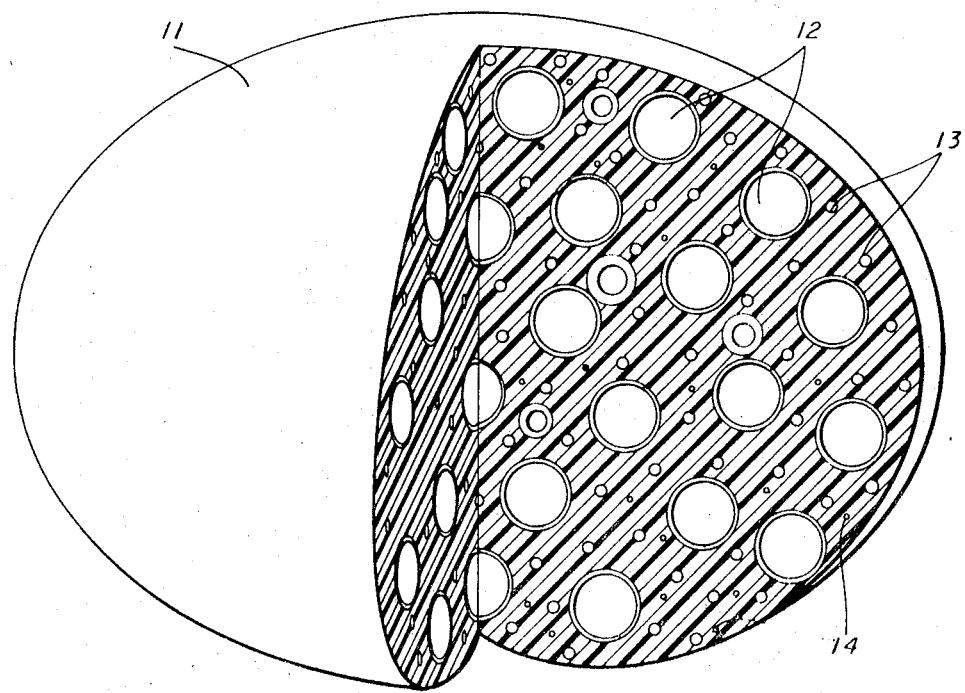
FIG. 1 shows a generally round buoyancy structure with a part-sectional view of the interior showing hollow spheres of various sizes.

In FIG. 1 is shown a buoyancy structure 11 filled with spheres 12, which are hollow in the center. Also shown in structure 11 are smaller spheres 13 which may be used in combination with the large spheres 12 in one embodiment of the invention. Also shown in FIG. 1 are microspheres 14 which are used in addition to the spheres 12 and 13.

Figure 2:
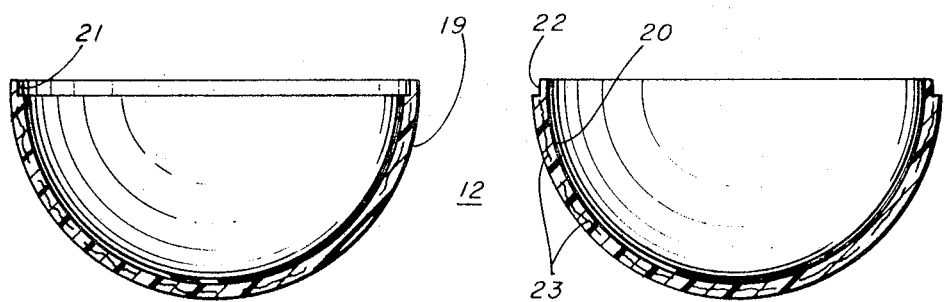
FIG. 2 shows in section two hemispheres of thermoplastic material having mating male and female rims.

The details of the spheres 12 are shown in FIG. 2. Female hemisphere 19 and male hemisphere 20 have their lips constructed, hemisphere 19 with outer rim 21, and male member 20 with inner rim 22, to fit snugly into each other, forming a sphere. Hemispheres 19 and 20, when joined together, may be sealed at their rims by any conventional means; high frequency sound is suitable.

Hemispheres 19 and 20 may be made of any of a number of thermoplastic resins. The preferred manner of making the hemispheres 19 and 20 is from a thermoplastic resin loaded with long glass fibers. It has been found particularly useful to use a styrene acrylonitrile loaded with 35 percent long glass fibers. Short glass fibers and lower levels of glass may be used, but have been found to give lower implosion pressure limits. The glass fibers are shown as fibers 23 in hemispheres 19 and 20. The hemispheres are formed by injection molding in matched pairs in a manner known in the art.

The size of the spheres has been determined to be optimum in the range from one-half inch diameter to 4 inches. At the present time, 2 inches diameter is considered preferred. The wall thicknesses run from three-hundredths of an inch to seven-hundredths of an inch.

After the spheres 12 have been formed by injection molding and sealing of the hemispheres, they are formed into the buoyancy structure by being placed in a mold as thickly as possible in a random manner. They are, in fact, substantially more densely packed in the mold than is shown in FIG. 1, the spheres being shown in FIG. 1 spread out for purposes of illustration. It has been found that with single diameters of spheres, on the average, about 62 percent of the volume of the mold is filled with the spheres.

Significantly higher volume packing ratios can be achieved by the use of spheres of two or more diameters. Assuming in this event that the larger spheres run toward the high side of the range above mentioned, it has been found optimum to make the diameters of the smaller spheres one-seventh of those of the larger spheres. With two diameters of spheres, the theoretical packing limit is 85 percent, but as a rule packing densities of 80 percent are achievable. The packing density may be raised further by the use of three or more sets of diameters, the third one-seventh of the second.

After the spheres are packed into the mold in the greatest possible density, the syntactic foam is poured in around the spheres. Before it hardens, it is fluid enough to completely fill all the interstices between the spheres and provide, when it hardens, a rigid matrix providing support for the spheres.

Syntactic foam as used here means a hardenable resin loaded with extremely small hollow glass microspheres, as defined by the ASTM Committee on Syntactic Foam. The resin may be polyester, epoxy, phenolic, or another exothermically hardening resin. The hardening process may be assisted by a heat cure. A resin microsphere foam should be selected of about 36 pounds per cubic foot.

Consideration of densities and costs will indicate how valuable the sphere-syntactic composite is. The spheres that have been fabricated to date range in density from 7.5 to 12.5 pounds per cubic foot When combined with syntactic foams, ranging in themselves from 35 to 40 pounds per cubic foot, overall densities of the matrix of 20 to 24 pounds per cubic foot are easily attained, and densities as low as 18 pounds per cubic foot are achievable with somewhat lighter syntactic foams. Considerations of cost will also make plain the value of the invention. The cost of the individual thermoplastic spheres comes to around 0.05 cent each in volume production. The total cost per pound of buoyancy of the composite comes to approximately 1 dollar per pound. However, the heavier density syntactic foams used alone previously ranged upwards of 8 dollars per pound of buoyancy. The saving cost is due in part to the substantial increase in pounds of buoyancy per pound of material and in part to the fact that 80 percent of the volume of the matrix is the very inexpensive thermoplastic spheres.

One of the major reasons why the implosion pressure limit of the spheres is approximately doubled appears to be that the bond between the syntactic foam and the thermoplastic spheres is very good. The thermoplastic spheres themselves are made substantially stronger by the use of the long glass fibers. Although 35 percent has been indicated as the optimum ratio for the glass fibers, ratios down to 20 percent are acceptable.

An alternative method of construction is a vacuum filling operation. In this mode, after packing the mold with the spheres, microspheres in dry form can be poured into the mold around the larger spheres. A low viscosity resin is then pumped into the mold, and the microspheres are impregnated. A subsequent heat cure is required with this process. This alternative, however, is not too practical for large pieces.

An alternative construction to the spheres is to form hollow elongated bodies with circular cross sections. Cylinders with hemispherical ends will be effective in some cases, as will bodies with oval cross sections perpendicular to the circular cross sections. These may be formed by mating pairs split along the long axis. They are not preferred, however, due to the difficulty of achieving high-packing densities with nonspherical shapes.

The uses of the present buoyancy material are many and varied in the underwater area. The first is in manned submersibles for supplemental buoyancy. A second is in underwater floats used to position research instruments. A third area of application is for flotation of various equipment in offshore oil drilling rigs. Using buoyancy material around such equipment will allow elimination of the tensioning devices now necessary and will consequently permit drilling in deeper waters. Many other uses will suggest themselves to the knowledgeable underwater engineer.

We claim:

1. A buoyancy material comprising:
   a plurality of molded hollow bodies of thermoplastic resin having a circular cross section in at least one plane and having a total specific gravity less than one; and
   a syntactic foam in which said bodies are encased, said foam having a specific gravity less than one.
2. A buoyancy material as set forth in claim 1, wherein said thermoplastic resin is loaded with long glass fibers.
3. A buoyancy material as set forth in claim 2, wherein said thermoplastic resin is styrene acrylonitrile.
4. A buoyancy material as set forth in claim 1, wherein said bodies are spheres.
5. A buoyancy material as set forth in claim 4, wherein said spheres are made of mating hemispheres fused together.
6. A buoyancy material as set forth in claim 4, wherein said spheres are of a diameter between one-half inch and 4 inches.
7. A buoyancy material as set forth in claim 4, wherein said spheres are each of one of two diameters, the ratio between the two diameters being 7 to 1.
8. A buoyancy material as set forth in claim 4, wherein said spheres have a wall thickness between 0.03 inch and 0.07 inch.
9. A buoyancy material as set forth in claim 4, wherein said spheres are each of one of a plurality of diameters, each of said diameters being one-seventh the next larger diameter.

* * * * *

UNITED STATES PATENT OFFICE
CERTIFICATE OF CORRECTION

Patent No. 3,622,437  Dated November 23, 1971

Inventor(s) Edward C. Hobaica, et al

It is certified that error appears in the above-identified patent and that said Letters Patent are hereby corrected as shown below:

Column 2, line 51, "0.05 cent" should read -- five cents --.

Signed and sealed this 31st day of October 1972.

(SEAL)
Attest:

EDWARD M. FLETCHER, JR.
Attesting Officer

ROBERT GOTTSCHALK
Commissioner of Patents